US009665074B2

(12) United States Patent
Lentzitzky

(10) Patent No.: US 9,665,074 B2
(45) Date of Patent: May 30, 2017

(54) SYSTEM AND METHOD FOR PROVIDING PLAYLISTS FOR SOCIAL TELEVISION

(71) Applicant: COMIGO LTD., Yarkona (IL)

(72) Inventor: Motty Lentzitzky, Raanana (IL)

(73) Assignee: Comigo Ltd., Yarkona (IL)

( * ) Notice: Subject to any disclaimer, the term of this patent is extended or adjusted under 35 U.S.C. 154(b) by 417 days.

(21) Appl. No.: 13/804,381

(22) Filed: Mar. 14, 2013

(65) Prior Publication Data
US 2013/0246530 A1 Sep. 19, 2013

Related U.S. Application Data

(60) Provisional application No. 61/611,024, filed on Mar. 15, 2012, provisional application No. 61/611,030, filed on Mar. 15, 2012, provisional application No. 61/643,372, filed on May 7, 2012, provisional application No. 61/643,375, filed on May 7, 2012.

(51) Int. Cl.
| G06F 15/16 | (2006.01) |
| H04N 7/173 | (2011.01) |
| H04N 11/00 | (2006.01) |
| G05B 11/32 | (2006.01) |
| H04L 29/06 | (2006.01) |
| H04N 21/41 | (2011.01) |
| H04L 12/28 | (2006.01) |

(52) U.S. Cl.
CPC .......... *G05B 11/32* (2013.01); *H04L 12/2816* (2013.01); *H04L 12/2834* (2013.01); *H04L 65/60* (2013.01); *H04N 21/4131* (2013.01); H04L 2012/285 (2013.01); H04L 2012/2849 (2013.01)

(58) Field of Classification Search
CPC .... H04H 20/28; H04H 20/76; H04N 7/17309; H04N 7/17318; H04N 21/4782; H04N 5/4401; H04N 5/44; H04N 5/44543; H04N 5/775; H04N 21/4113; G06Q 10/10; H04L 29/06; H04L 29/08072; H04L 29/06027; H04L 12/581
USPC ........................................................ 709/204
See application file for complete search history.

(56) References Cited

U.S. PATENT DOCUMENTS

| 8,644,684 B2* | 2/2014 | Yoshida ............... G11B 27/034 386/278 |
| 2005/0235334 A1* | 10/2005 | Togashi .............. H04L 12/2834 725/117 |
| 2006/0263048 A1* | 11/2006 | Sato .................. H04N 21/42207 386/247 |
| 2007/0005788 A1* | 1/2007 | Kim ...................... H04L 12/185 709/231 |
| 2008/0025535 A1* | 1/2008 | Rajapakse ............. H04L 65/605 381/311 |

(Continued)

*Primary Examiner* — Mahran Abu Roumi
(74) *Attorney, Agent, or Firm* — Yagod Morris & Associates Ltd.

(57) ABSTRACT

A system and method for managing a common media session shared by a plurality of media consumers. A primary media consumer may be enabled to set up a media session which secondary media consumers may follow. The media session may involve the streaming of selected media content directly or indirectly from at least one media provider. A communication mechanism may be provided to allow participating media consumers to communicate with each other during the media session.

18 Claims, 10 Drawing Sheets

(56) References Cited

U.S. PATENT DOCUMENTS

| | | | |
|---|---|---|---|
| 2008/0060028 A1* | 3/2008 | Chiang | H04N 21/42204 725/88 |
| 2008/0120501 A1* | 5/2008 | Jannink | G06F 17/30017 713/163 |
| 2009/0077600 A1* | 3/2009 | Lin | H04N 21/434 725/99 |
| 2009/0217329 A1* | 8/2009 | Riedl | H04N 7/17318 725/93 |
| 2010/0011135 A1* | 1/2010 | Jawa | H04L 67/025 710/19 |
| 2010/0333019 A1* | 12/2010 | Oschwald | G06Q 30/02 715/810 |
| 2011/0157467 A1* | 6/2011 | McRae | H04N 5/4401 348/552 |
| 2012/0192229 A1* | 7/2012 | Hunter | H04N 5/45 725/38 |
| 2012/0311094 A1* | 12/2012 | Biderman | H04N 5/783 709/219 |
| 2013/0073623 A1* | 3/2013 | Nguyen | H04N 21/23103 709/204 |
| 2013/0090170 A1* | 4/2013 | Reed | A63F 13/35 3/35 |
| 2013/0179275 A1* | 7/2013 | Harb | G06Q 30/0241 705/14.73 |

\* cited by examiner

SYSTEM AND METHOD FOR PROVIDING PLAYLISTS FOR SOCIAL TELEVISION

CROSS-REFERENCE TO RELATED APPLICATIONS

This application claims the benefit of priority from U.S. Provisional Patent Application 61/611,024, filed Mar. 15, 2012, U.S. Provisional Patent Application 61/611,030, filed Mar. 15, 2012, U.S. Provisional Patent Application 61/643,372, filed May 7, 2012, and U.S. Provisional Patent Application 61/643,375, filed May 7, 2012, the contents and disclosures of which are incorporated by reference in their entirety.

FIELD OF THE INVENTION

The disclosure herein relates to social media such as social television and the like and its use for allowing media consumers to share streamed media content. In particular, the disclosure relates to providing media consumers a way to publish their media consumption behavior and preferences and for other media consumers to follow these behaviors.

BACKGROUND OF THE INVENTION

The media viewing experience is turning richer with video content becoming available on increasingly diverse devices such as television, personal computers, tablet computers, smart telephones, mobile communication devices with web access, hand held devices and the like to further the quality of the media consumer experience. Furthermore, video content has become more extensively available for viewing through cables, Satellites or via the web, and with the advancement of Digital Video Recordings (DVRs) technology, time-shifted television watching has become more relevant. In parallel, the social environment is changing, taking advantage of new emerging technologies and yielding a whole new world of experiences. Television broadcasting networks continue to deliver digital content in diverse areas of interest, answering different tastes and flavors. Combining the digital media, specifically the television as a platform, with the social environment increases the demand for sharing digital content and views.

No doubt, the television is a wide reaching vehicle and a highly significant player in the digital media content domain. Recent studies of consumer behavior and television measurements (eMarketer—Digital Intelligence, Nielsen) claim that 99% of American households watch television on a regular basis. Furthermore, the studies highlight the fact that the average duration of adults watching television is higher than online surfing; four and half hours per day compared to an average of just two and half hours per day. Additionally, the percentage of American homes having at least one television set is reaching 99%, with two thirds of them owning at least three sets. These numbers highlight the fact that television is still a most widespread and premier entertainment platform.

As the role of social interaction in the media experience increases, the disclosure herein relates to enriching the social experience combining advanced technology, television and social traits while using the concept of play-listing follow-up.

SUMMARY OF THE INVENTION

It is according to a first aspect of the current disclosure to introduce a streamed content sharing system for managing a common media session shared by a plurality of media consumers. The system may comprise at least one client terminal connectable to at least one media content provider; and at least one playlist repository in communication with the at least one client terminal, the playlist repository comprising at least one playlist session object providing media streaming directions. The client terminal may therefore be operable to access the playlist session object and to stream media content according to the media streaming directions. Variously, the media streaming directions may comprise at least one of: a pointer to a media channel; a start time; an end time; a duration and the like as well as combinations thereof. Additionally or alternatively, the playlist session object may comprise at least one pointer to media content selected by a primary media consumer.

Optionally, the client terminal may comprise a media renderer. Variously, the media renderer may be selected from the group consisting of a television, a tablet, a smartphone, a computer, a laptop or the like. Alternatively, or additionally, the client terminal may be connected to at least one media renderer via at least one communication channel selected from the group consisting of VGA cable, HDMI Cable, WiFi chipset and the like as well as combinations thereof.

In some embodiments, a primary client terminal associated with the primary media consumer is operable to update the playlist session object in real time.

Where required, the streamed content sharing system may further comprise at least one data processing unit. The data processing unit may be operable to execute a software application for example, comprising at least one of: a playlist management module operable to manage the playlist repository; and a social configuration module operable to manage at least one social set. Optionally, the playlist management module is configured to assign access rights to the at least one playlist session object. Optionally, again, the social configuration module is configured to manage communication between the plurality of media consumers.

It is according to another aspect of the disclosure to teach a method for sharing streamed content between a plurality of media consumers. Such a method may comprise: creating a playlist session object in a playlist repository, the playlist session object providing media streaming directions; at least one client terminal accessing the playlist session object; and the at least one client terminal streaming media content from a media content provider according to the media streaming directions. Variously, such media streaming directions may comprise at least one of: a pointer to a media channel; a start time; an end time, a duration and combinations thereof.

Optionally, the step of creating a playlist session object comprises: a primary media consumer uploading the media streaming directions to the playlist repository.

Where appropriate, the step of at least one client terminal accessing the playlist session object may comprise: displaying a set of playlist session objects to a secondary media consumer associated with the client terminal; the secondary media consumer selecting a required playlist session object from the set; and the client terminal accessing the required playlist session object.

Alternatively, or additionally, the step of at least one client terminal accessing the playlist session object may comprise at least one secondary media consumer associated with the at least one client terminal electing to follow a primary media consumer.

Accordingly, the method may further comprise providing a communication channel between the primary media consumer and at least one the secondary media consumer.

Optionally, the method may comprise editing the playlist session object in real time to reflect media selections of a primary media consumer.

According to still another aspect of the disclosure, a computer implemented method is taught which may be embodied in a media renderer for publishing a playlist session, when executing on at least one processor, comprising the steps of: presenting at least one playlist streamed content item, to a user for selection; receiving at least one indication from a user of selecting at least one playlist streamed content item; and updating at least one playlist session object with selected said at least one playlist streamed content item; and uploading at least one playlist session object into a playlist repository with assigned default access rights. Optionally, the method further comprises assigning access rights indication for said playlist session object. Optionally again, the method may further comprise sending notifications to at least one social member of at least one social group. Optionally, the method further includes updating by analyzing said at least one streamed content item and adding a formatted textual description. Optionally, the method may further comprise the step of receiving tagging indication for said playlist session object with at least one viewing category tag.

Variously, streamed content may be selected from the group consisting of graphics, picture, video clip, text and music files stored in a data repository or a time slot of a selected TV channel, wherein timeslot may be defined by a program name.

In another aspect of the disclosure a further computer implemented method is taught, which might be embodied in a media renderer comprising the steps of: displaying, via a graphical user interface, at least one playlist session object of at least one publisher; receiving input, via a graphical user interface, from a user, the input specifying said at least one playlist session object; and playing, via the graphical user interface, the streamed content of said at least one playlist session object. Optionally, the playing may be activated immediately. Additionally or alternatively, the playing is configured to be activated at a preset time. Optionally, playing is scheduled to follow at least one TV channel program timeslot. Optionally, again, the method may further comprise the step of sending, via the graphical user interface, a joined-in notification to said at least one publisher. Optionally, at least one publisher is at least one member of at least one social group. Where appropriate, at least one playlist session object is optionally characterized by at least one social category.

BRIEF DESCRIPTION OF THE DRAWINGS

For a better understanding of the embodiments and to show how it may be carried into effect, reference will now be made, merely by way of example, to the accompanying drawings.

With reference now to the drawings in detail, it is stressed that the particulars shown are by way of example and for purposes of illustrative discussion of selected embodiments only, and are presented in the objective of providing what is believed to be the most useful and readily understood description of the principles and conceptual aspects. In this regard, no attempt is made to show structural details in more detail than is necessary for a fundamental understanding; the description of the drawings making apparent to those skilled in the art how the various selected embodiments may be put into practice. In the accompanying drawings.

DETAILED DESCRIPTION OF THE INVENTION

Figure 1:
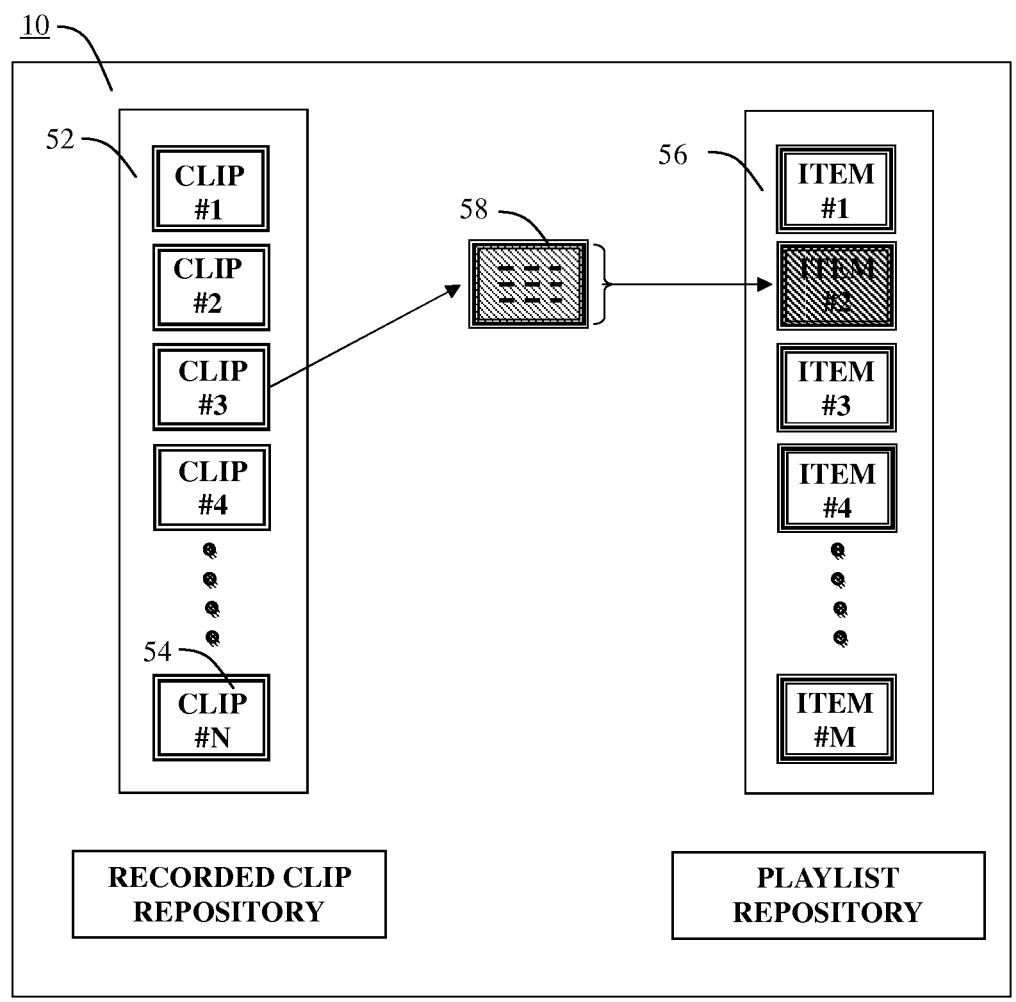
FIG. 1 schematically illustrates an example of a prior art playlist.

Aspects of the present disclosure relate to sharing television and digital media viewing behavior and preferences. In particular, systems and methods are presented for using television or other digital media to allow media consumers to publish their media consumption behavior and preferences and for other media consumers to follow these behaviors.

The combination of a social network and digital media may enable the use of media renderers such as televisions or other digital viewing devices as a social platform, for viewing broadcast digital content, while sharing views with a large social audience. Moreover, sharing and/or conveying a message through the television with visuals, movement and sound may reach members at particularly attentive and alert opportunities.

The term playlist is used in a variety of different ways, often referring to a selection of chosen media samples such as songs or video clips or the like organized into a specific order for playing. The particular content may not necessarily contain music only; rather it may reflect any audio or video theme organized collectively in different variations, such as newscast, sport highlights, educational content, travelling information, photography and the like.

There are additional environments and devices offering tremendous flexibility for viewing digital content associated with playlists, providing a consumer with control over what to watch, at what time and for what duration. Such devices, like Digital Video Recorders (DVR), offer another way to enjoy media content. The DVR has introduced "time-shifted" television viewing interaction, supporting a higher degree of personalization and enabling recording of video playlist for personal usage.

The internet as a platform, may offer a large amount of video and sound capturing abilities for viewers, in terms of watching or listening to elements of either sound or video, providing further functionality of playlisting and sharing in social networks. For example, YouTube, one of the leading video content driven websites, supports the creation of personal playlists, embedding content in other sites and the like.

Forming a playlist may involve building a stream of music or video clips collection aggregated into a theme, resulting in a desired digital media structure. Such a playlist is illustrated reflected in FIG. 1, which schematically represents a playlist system 10. The playlist system 10 includes a library 52 of recorded video clips and a playlist repository comprising at least one playlist 56. Each playlist 56 is formed of a series of playlist items such as media clips, video clips or the like, such playlist items records 58 may point to a video clip element 54 or other media clip element hosted in the video clip library 52. The playlist item records 58 may be played in the order according to the preferences of the creator of the playlist. For example, viewers can create a stream of their favorite newscast, educational lesson, or their friends' favorite sports clips.

Borrowing playlist terminology for the broadcast media environment may facilitate a common dialog between viewers around the streamed media content, creating a social centric experience of sharing viewing preferences. The following disclosure relating to playlist follow-up, may enable the creating, publishing and sharing of television content of viewing interests and preferences. Interested social members may join in to participate in a common social session or public agenda. More specifically, it may enable the sharing of current viewing activity, favorite playlist sets or schedules of television programs to other social group members. The media management system may further enable following a contact's live changes between television channels or other media sources. Additionally or alternatively the system may enable publishing of comments or discussions between members of a social set in parallel to the viewed content.

A media experience may simulate a social group consuming digital content of mutual interest, while interacting socially. The owner of the playlist or another social contact having appropriate permissions may serve as a primary media consumer hosting and moderating the social experience. Accordingly, the host or the playlist moderator may provide chat and commentary alongside the media and throughout the social interaction. Optionally, the host or the assigned playlist moderator, as a moderator, may have superior rights to enable contributions or interactions from followers or secondary media consumers.

The dialogue and chat accompanying the streamed media content, as determined by the playlist follow-up session, may have a social benefit, offering various opportunities. It may offer a social agenda between friends with common interests watching a favorite sport program, a food and nutrition program and the like. It may be analogous to a book club, where the book is replaced by digital content, while enabling chats, expression of opinions or commenting. It may offer professional teaching agenda of virtual classes around particular learning material with ability of conversing with the teacher. It may offer abilities of delivering a message while gaining immediate response feedback related to currently displayed content for any type of campaign—political, commercial, social and the like.

Moreover, a member of a social space may be able to follow several playlists of other members of the social set, possibly simultaneously on the same client terminal, for example using tabs, panels, split screens and the like for switching between current live sessions.

According to the disclosure, a media consumer, such as a television viewer or the like may be able to follow more than a single representation of a playlist. Such a playlist may contain a collection of session objects, each characterized by media time slots and a media broadcast channel, creating a user and community centric media consuming experience, for any social circle, or followers of a personality.

It is noted that a wide range of digital content, such as text, still images, moving images, audio content and the like, in communicating messages may be used in a variety of digital platforms and for social interaction. Such multimedia social interaction may impact the nature of media consumption such as viewing television. The impact of television, providing interactive abilities of sharing and communicating platform in a social community may offer significant advantages.

It is further noted that the current disclosure may provide a mode of operation enabling users to follow viewing preferences of social contacts while using a media renderer in a social context. In particular, the present disclosure enables functionality of a media renderer such as a television, tablet, smart telephone, computer or the like, to access a published playlist of a social member. The published playlist may provide live follow-up of television viewing preferences of a social member at a specific time of the day and a specific television channel. Such a playlist may be published openly or to a specific social group aiming at sharing and communicating through his/her viewing preferences. The use of analytical tools and/or statistical analysis and/or machine learning algorithms may make the social interaction experience more pertinent, answering user preferences, sharing and communicating interests more effectively. Furthermore, the enhancement of this type of following functionality by social group members may have a significant impact socially. It may contribute to changing the way television content is consumed with respect to becoming more community centric to media interaction.

Aspects of this disclosure are based on technological infrastructure for controlling media renderers such as televisions, tablets, smart telephones, computers or the like, according to content available, user preferences and social information mechanisms. People socialize within a shared social space, and the methods and systems of communication between television viewers with current disclosure of publishing followers' playlist implementation may better facilitate the television as a real social engagement platform.

Definitions

As used herein, a user refers to an individual (or a group of individuals) operating a system or a component thereof of the disclosure (e.g., a client terminal) or performing a method of the disclosure.

As used herein, an owner refers to an individual (or a group of individuals) that is associated with a particular client terminal.

As used herein, a social group comprises one or more members. A member may be an individual or a group of individuals. A social group may be classified, for example, according to various preferences, tastes or interests of social spaces. One or more members of the social group may be authorized, by assigning permission, to perform remote recording of desired content in the system of one or more other members of the social group, or may be narrowed to specific categories only.

The social group, or a subset thereof, may be a social set, which is defined herein as a set of members that are configured to view a shared media session. The shared media session is a media content that is configured to be viewed simultaneously (or recorded) by members of the social set to which the shared media session is assigned. One shared session may be assigned to one or more social sets.

The social group, the social set, and the individual member of a social group may be referred to, generically, as a social entity. A social group comprises one or more members. A social set comprises one or more members within a social group assigned to a shared media session. The various social entities may be nested. That is, one or more members may be included into a social group or a social set, and one or more social sets may be included in a social group.

A user may be a member, and a member may be a user.

As used herein, media content may be any information content that may be experienced by a user, including but not limited to television shows, radio shows, movies, video clips, slideshows, multimedia presentations, pictures, games, audio content, music, and the like.

As used herein, a client terminal is a device that is operable to meet user defined preferences, monitor available media content and/or control the media content input to a media renderer. The client terminal may include, or be externally connected to, a digital video recorder (DVR). A client terminal may comprise, be connected to, be incorporated into or be otherwise associated with, without restriction, a television set, a set-top-box (STB), a desktop computer, a laptop computer, a tablet, a telephone, a mobile communication device or the like. A set-top box (STB) is an information appliance that connects to a television set and an external source of signal, decoding that signal into content that can be presented on a television screen or other display device as media content. The STB may be a cable television STB. As used herein, a DVR is a device that is capable of recording media content of various types; television programs, audio content, visual content, audiovisual content, multimedia content and the like, for example by saving them onto a recording device such as a hard drive for a later use. Such content may be subsequently used for playback, viewing, editing or the like. The DVR may variously include a local data storage unit, a remote data storage unit accessible by a media renderer client terminal or the like. The DVR may additionally or alternatively include a device configured for playback from VOD, DVD recorders, server based DVR's services and the like. Additionally, while recording, users may switch to view other television programs or to various other media modes.

As used herein, a media renderer is a device that is operable to present media content into a consumable form (e.g., visible, audible and the like). The media renderer may be one or a combination of, without restriction, television sets, monitors, speakers or the like.

Playlist Follow-Up Functionality

Playlist follow-up functionality may provide any group member of any subscribed social group, to create and publish playlists of streamed content. The playlists may be published publicly or may be presented to particular members selected manually or automatically based upon preferences and content choices. Live follow-up of viewing preferences by its playlist may be open to all, to a specific social group or to a specific authorized person to whom appropriate permissions have been given.

The interaction with the user via a user friendly interface may be driven by a management module. Additionally, it may work in different possible architectures, for example, using a network based approach to allow remote activities.

Time and content are important factors in determining the playlist follow-up. Time may represent time of the day and duration of permissible follow-up, but may also be used differently to define different time slots. Content may be identified by reference to a media channel, for example. Alternatively or additionally content may be identified by a name, number, broadcast time or other designator of a program or content type. The content may be associated with a recording operation or selected from a broadcasting schedule or the like.

A list of contacts may consist of a particular social group, or may contain various social groups, which may be classified, for example, according to various preferences, tastes or interests of social spaces. Any member of the contact list may be authorized, by assigning permission to participate in a live follow-up of a playlist, or it may be open to all social groups, with no reference to authorization.

Where required, a dedicated playlist may be provided specifically to manage such functionality as a stand-alone application. Alternatively or additionally, the application may be integrated with other features of a social platform, for example, such as described in the applicants co-pending applications such as PCT Patent Application No. PCT/IB2012/054016 and PCT Patent Application No. PCT/IL2013/050186 and U.S. patent application Ser. No. 13/787,905 which are incorporated herein by reference.

It is noted that while the playlist follow-up application is running, users may simultaneously view superimposed windows of several playlists, switch between different television programs or various other media types, such as television, music gaming content and the like. Thus, for example, when a playlist follow-up is activated on any media renderer for example via an STB, software application or the like in a social space, a user may perform a variety of activities such as following playlists of different social members, switching to another channel, accessing other media, social communicating or the like.

Media Management Software System

The architecture of the playlist follow-up media management software may include various functional modules such as a playlist management module and a social configuration module. The playlist management software may include sub-modules such as a publishing sub-module and a retrieval sub-module and the like, where the publishing sub-module may further include a permission sub-module, for example. Optionally and additionally, playlist follow-up management software may be integrated into other one or more expanded social media platforms.

The playlist management module may provide editing functionality of content items, control follow-up functionality, data reception and communications with the other modules. Additionally or alternatively, follow-up management module functionality may include for example, creating a new playlist, adding/removing content items to/from a playlist, deleting a playlist, storing of a playlist, uploading/removing a playlist to/from follow-up playlist repository, assigning access rights to a playlist via the permission sub-module and the like.

The social configuration module may allow the social environment to be configured to suit requirements. For example, configuring the social environment may include the creation of social groups, adding or removing members of social groups editing related social information of members, and may further be extended as detailed in FIG. 4 hereinbelow. The social configuration module may be implemented to provide lightweight and basic architecture for the playlist follow-up media management software or optionally, may be integrated with other social modules, for example, such as described in the applicant's co-pending applications.

User Preference Profile

The interests of a viewer may be reflected through a user preference profile. User preference profile may serve, additionally, in the follow-up context as a tool for building categories to satisfy tastes and interests of the client terminal owner. The user preference profile may be created and configured manually or automatically. Manual configuration may designate categories of interests and the like, while automatic configuration may require machine learning algorithms or statistical analysis tools to deal with its complexity and high dimensionality.

Additionally or alternatively, the automatic configuration process may score for each item of interest, for example, based on a number of watching times or the like.

The configuration process for the user preference profile may be expanded to include collaborating information. Thus, the configuration process may include the collection of data relating to user preferences. Optionally, it may include personal tastes of multiple users (e.g., a household) sharing a common television set or simultaneously viewing the same content on different television sets or different media devices in different locations. Data filtering, in any of its forms, may produce a number of recommendations such as a household profile, personal preferences profile or other data structure reflecting viewers' preference. The form of recommendations may provide personalized targeting, and measurement capabilities to assess the impact of television advertising and its performance.

Further, the preference profile may be utilized to generate suggestions for social entity selection and media content selection for social follow-up playlist activity.

Setting Follow-Up Activity

The playlist follow-up feature may allow, for illustrative purposes, several possibilities for setting the following-up activity of a media management system. Such possibilities may be, for example: displaying program timeslots for various programs; setting playlist categories; assigning permissions for joining a specific follow-up playlist; monitoring access of follow-up playlist; preview playlist follow-up schedule; management of the social environment and the like.

For manual configuration of the user preference profile, the management module may drive the interaction with the user via a user-friendly interface. Additionally, the configuration process may work in different possible architectures, such as network based approach as described herein, to allow for the configuration of the user preference profile through remote activities.

For manual configuration of follow-up activities, the management module may drive interaction with the user via a user friendly interface. Additionally, the configuration process may work in different possible architectures, such as network-based approach as described herein to allow for the configuration of the user preferences through remote activities. It may further allow, for illustrative purposes, additionally or alternatively activities like: setting playlists configuration; assigning permissions, editing playlists; monitoring follow-up information; management of the social environment and the like.

Media management systems such as those described herein may communicate related information to the user via an overlay superimposed upon the screen of a television set or other media renderer.

System Components

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data.

Optionally, a network connection may additionally or alternatively be provided. User interface devices may be provided such as visual displays, audio output devices, tactile outputs and the like. Furthermore, as required, user input devices may be provided such as remote controls, keyboards, cameras, microphones, accelerometers, motion detectors or pointing devices such as mice, roller balls, touch pads, touch sensitive screens or the like.

Optionally, with the introduction of Wi-Fi integrated chipset into televisions, enhanced user interface may use smart phones, tablet or other sophisticated devices to make the sharing experience easier and friendlier, enriching implementation functionality.

Optionally, a system may include a client terminal such as a set-top-box (STB), mobile communication device or the like, possibly with web access which is operable to meet user defined preferences, monitor available media content and control the input to a media renderer, accordingly.

System Embodiments

With reference to the block diagram of FIG. 1, schematically illustrating a possible structure of a prior art playlist data repository 10, such a structure may be configured in some systems. The structure may include a recorded clip repository 52 storing prerecorded media clip objects 54, a playlist repository 56 storing ordered pointers 58 to a selection of prerecorded clips.

Figure 2:
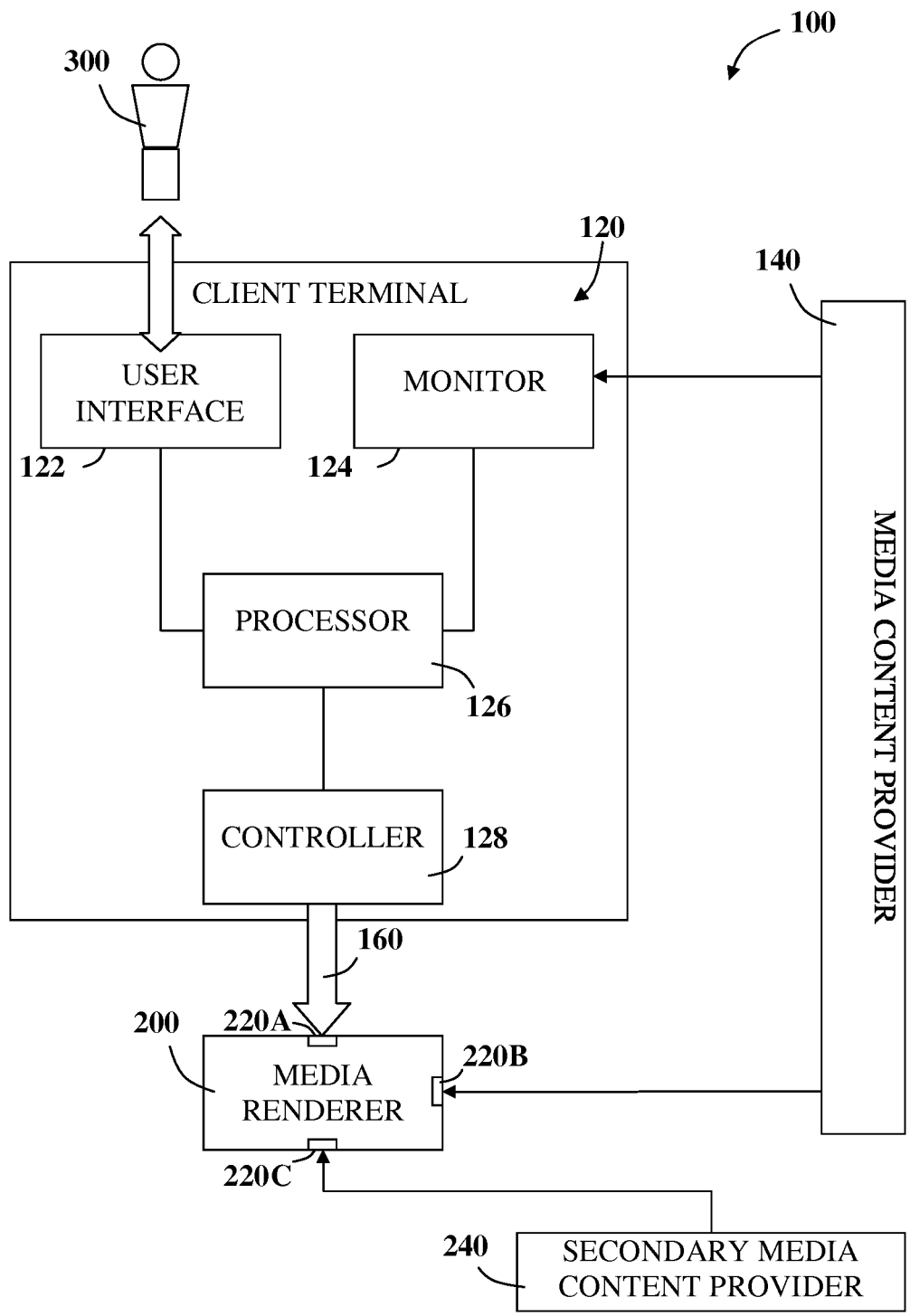
FIG. 2 is a block diagram representing one possible configuration of selected elements of a system for content based management of a media renderer with local processing of a playlist follow-up management system.

Referring to the block diagram of FIG. 2, the selected functional components are represented of one possible configuration of selected elements of a media management system 100 for content based control of a media renderer 200. This configuration may have added functionality of stream of adverts, locally processed and managed, for example, such as described in the applicants co-pending application such as PCT Patent Application No. PCT/IB2012/054016 and PCT Patent Application No. PCT/IL2013/050186 and U.S. patent application Ser. No. 13/787, 905 the contents of which are incorporated herein by reference. The management media system 100 includes a client terminal 120 in communication with a media content provider 140 connecting to the media renderer 200 via a communication channel 160. The client terminal 120 includes a processor 126 and may include additional components such as a controller, a user interface and a media monitor.

Optionally, a user interface 122 of the client terminal 120 may be used to allow a media consumer 300 setting preferences to be used by the management media system 100 selecting control signals sent to the media renderer 200. Various user interfaces 122 are known in the art such as keyboards, touch screens, remote controls, pointing devices and the like and may be used to input data to the client terminal 120. Optionally, the media renderer 200 itself may serve as at least part of the user interface 122, for example, by providing an output screen or input device.

The processor 126 of the management media system 100 is operable to receive media content data from the media-monitor 124, and to record a user preference profile related to media content accessed. The controller may further select control signals which the controller 128 may send to the media renderer 200. It is particularly noted that the media management system 100 may be managed by application software executed by a computing device such as a computer, tablet computer, laptop computer, smart telephone, television, STB or the like.

It is noted that the media renderer may comprise a plurality of connector ports 220A-C which may be connected to a number of media sources. For example, a first port 220A may be connected to the client terminal 120, a second port 220B may be connected to the media content provider 140 and a third port 220C may be connected to a secondary media content provider 240.

The filtering and recommendation of the television social functionality categories may be controlled by a user preference profile, for example, generated by a software package running on the client terminal processor 126, or customized manually. Such a preference profile may reflect the categories and preferences of viewing throughout the day and may indicate potential desired product or service for the user. The preference profile may be stored locally or may be sent to the media content provider for remote storage. The product/service offering stream to the client terminal may be filtered or adjusted to suit user preference profile to meet social functionality preferences.

The user's preference profile may reflect categories of preferences of playlist viewing, based on program content or may be configured individually to indicate distinction. It is also noted that a user preference profile may be personalized for a user or a client terminal itself. Where a client terminal is associated with stationary hardware such as a television or STB, it may be useful to create a detailed preference profile for the client terminal reflecting, say, the viewing habits and purchasing preferences of a household. It is noted that the user preference profile may be selected based upon statistical analysis of the viewing habits of the whole household.

In some embodiments, a media stream may be accessed directly by a media renderer, for example, via the second input port 220B. It will be appreciated that where the client terminal is connected to the media renderer 200 via the first port 220A, it will not have control over content accessed via the second input port 220B.

By way of illustration only, control signals may use the Consumer Electronics Control (CEC) feature available, for example, with HDMI connections or the like. The CEC feature may provide a controller 128 to command and control the media renderer 200 by sending control signals via the client terminal 120. For example, CEC Routing Control allows a user to control the switching of signal sources between input channels.

Where required, the controller 128 may be operable to send control signals switching the input channel of the media renderer 200 to the first input port 220A as required. Accordingly, a personalized advert stream may be sent from the client terminal 120 to the media renderer 200 via the first input port 220A for the duration of the advertising break in the media content stream. Optionally the media management system 100 may be further operable to switch access back to the second port 220B at the end of the advertising break; alternatively, the media content stream may be provided to the media renderer 200 via the client terminal 120.

Figure 3A:
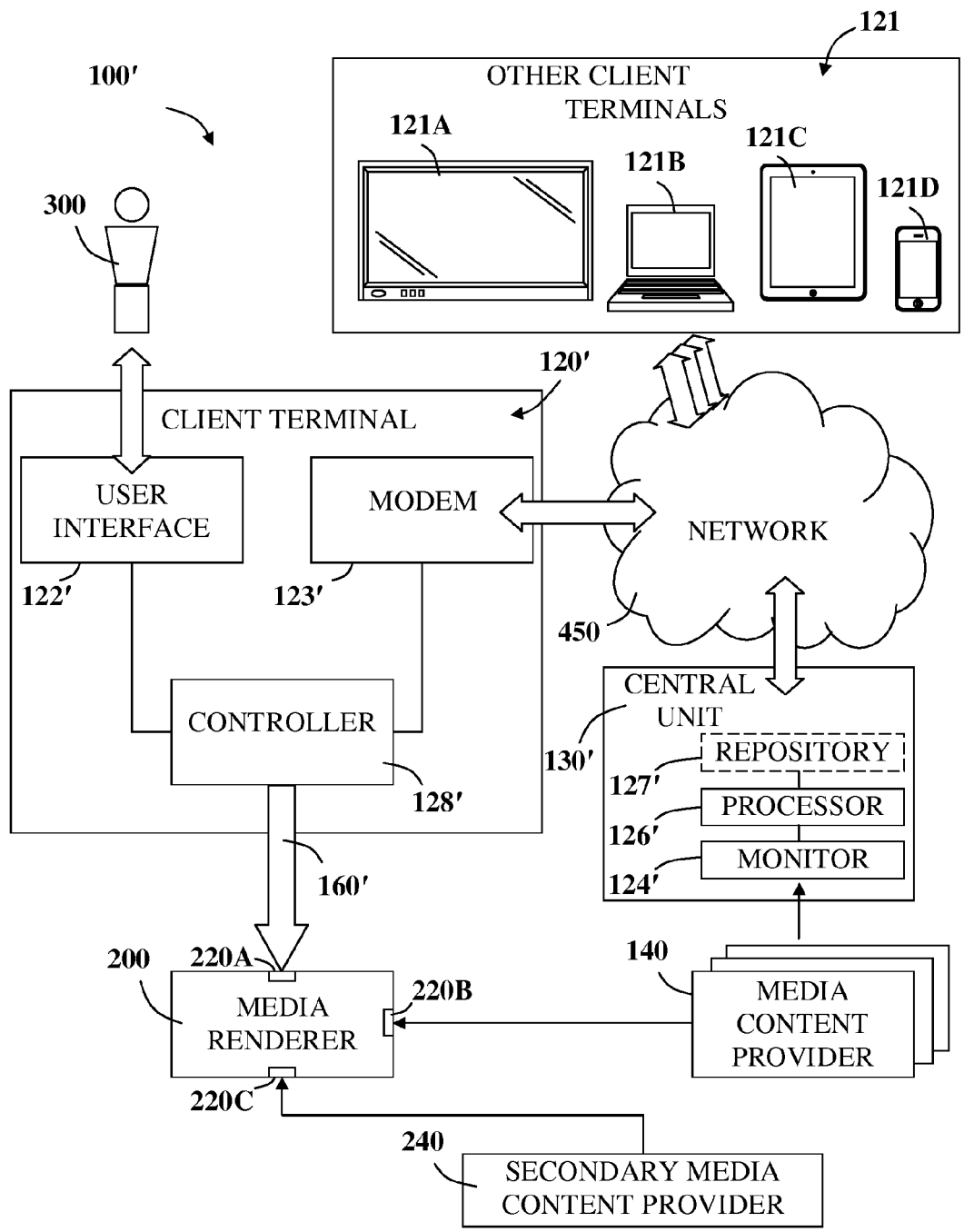
FIG. 3A is a block diagram representing another possible configuration for a distributed network-based system for social content based management of a media renderer with central processing of playlist follow-up management system.

Referring now to the block diagram of FIG. 3A, another possible configuration for a media management system 100' may be a distributed or network-based system for content based control of a media renderer 200. The network-based distributed media management system 100' includes a client terminal 120' and a central unit 130' in communication with a network 450, such as the World Wide Web, or a local area network or other such networked computing system.

The central unit 130' may provide specific functionality of content based control processing of the network-based distributed media management system 100' to be performed remotely and communicated to the client terminal 120' via a modem 123' providing a connection to the network 450. For example, the central unit 130' may be operable to receive media content data from a media-monitor 124', and to record a user preference profile related to media content accessed. The central unit 130' may further have a processor 126' receiving information, such as the current viewer preferences profile (with targeting characteristics) created locally on the client terminal 120' or TV associated events from the client terminal 120' to process and update user preference profile (with targeting characteristics) on the central unit 130', controlling media content sent to this client terminal.

It is noted that the architecture of the central unit 130' may further include a playlist repository 127'. The playlist repository 127' may be used for storing system data, and particularly storing the playlist objects representing follow-up sessions.

It is further noted that for network-based architecture as indicated in FIG. 3A, some of the analytics may be performed on the controller of the terminal client. This may, for example, establish and maintain a local user preference profile. Alternatively or additionally, the media management system 100' may send data pertaining to a viewer's watching behavior to the central unit 130' and a user preference profile may be generated and maintained remotely.

It is further noted that a number of different client terminals 121 may access a common central unit 130' possibly via a network 450 such as the internet or the like. Accordingly, a social set of users using a variety of client terminals such as televisions 121A, computers 121B, tablets 121C, telephones 121D or the like, may be connected via the common central unit 130' as described herein.

Figure 3B:
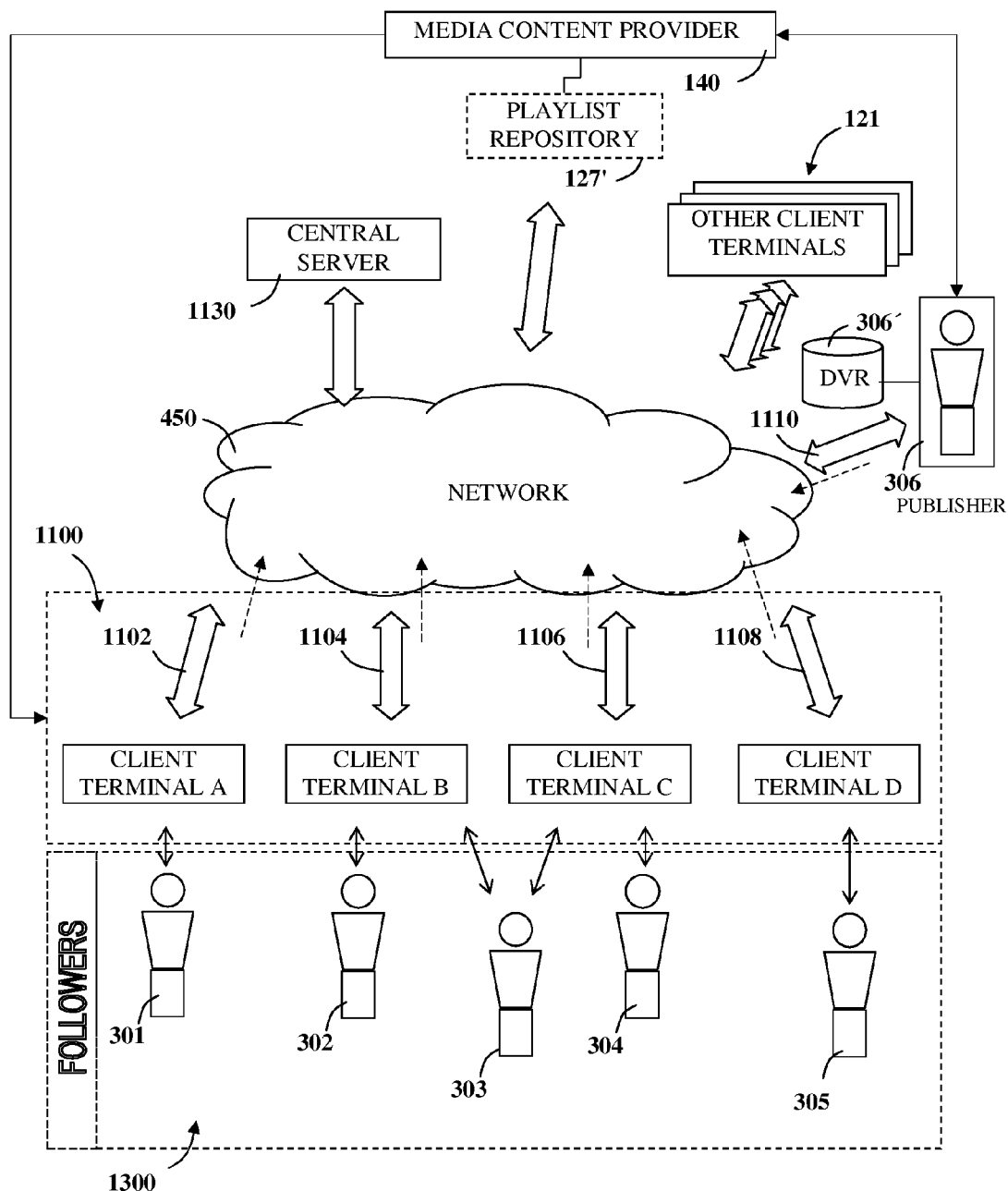
FIG. 3B is a block diagram illustrating a possible example of a shared media session managed by a central server for a social set of users.

Referring now to the block diagram of FIG. 3B, the network-based architecture of a possible sharing playlist management system, may use a central server 1130 to manage a shared media session 1100 for a social space 1300 of selected contacts 301-306. Each contact is connected to the central server 1130 by at least one client terminal such as described hereinabove.

A social space 1300 may be created, for example by a contact inviting selected members of a social group to participate in a shared media session 1100. Alternatively or additionally, the members of a social space 1300 may be generated automatically.

A shared media session 1100 may centrally manage the network communication channels 1102, 1104, 1106, 1108 between participating client terminals and the central server 1130. Accordingly, the member contacts of the social space 1300 may access a common media broadcast. Furthermore, the members of the social space may access a common social space providing interaction such as chat, VOIP or the like during the shared media session. For example, such communication may be controlled via a contact communication sub-module for exchanging views and comments related to the shared streamed content of the viewed session controlled via a playlist object (as illustrated hereinafter in FIG. 4).

It is noted that members of a common social space 1300 may have common interests and the shared media session 1100 may serve as a useful platform for playlist follow-up, to enable sharing of viewing preferences. For example, publisher 306 may be wishing to share viewing preferences via publishing a playlist session, enabling other contacts to follow-up his preferences, establishing a joined shared session. In this example, a group of contacts may simultaneously view a series of sports matches together, sharing the experience together while able to chat and communicate throughout.

Although the different media management system architectures described hereinbefore are for illustrative purposes, those skilled in the art will appreciate that other technologies may be used to implement the method of controlling group recording.

The playlist repository 127' may be used for storing system data, and particularly storing the playlist session objects representing for follow-up sessions. Such playlist session objects may provide media streaming directions, such as pointers to a media channel; a start time; an end time, a duration for enabling client terminals to select streamed media content.

Figure 3C:
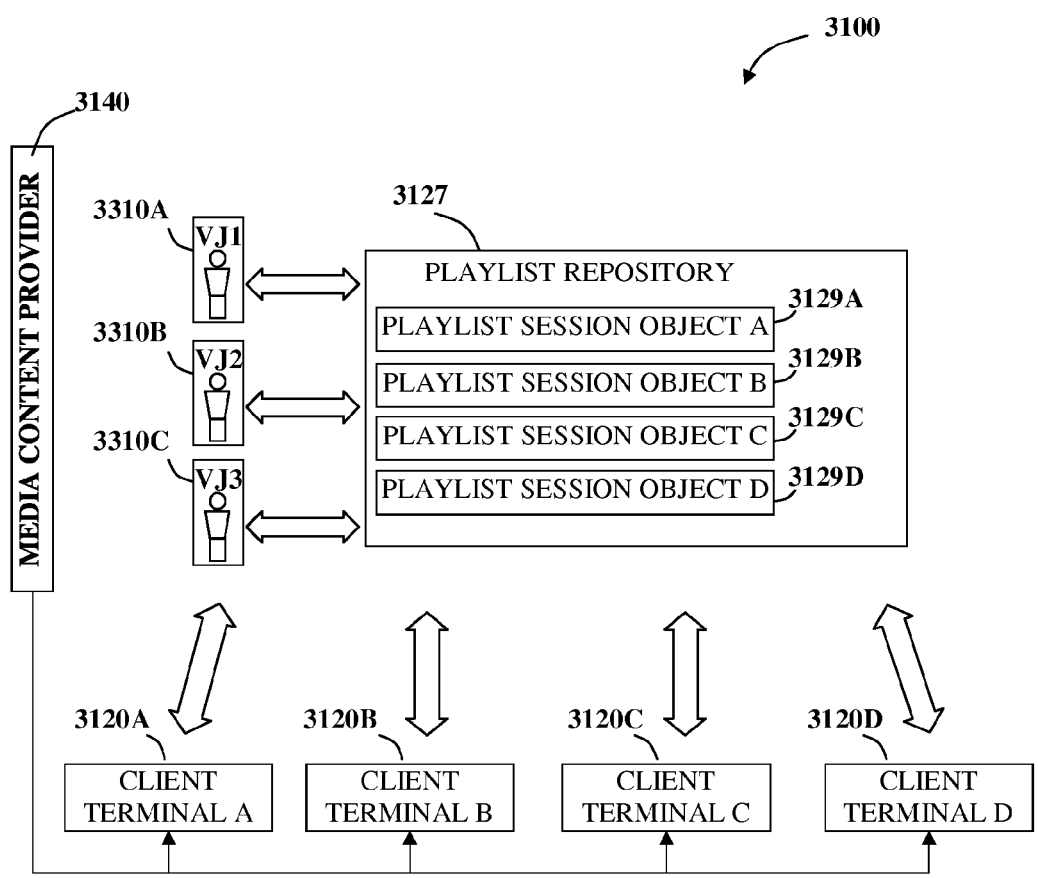
FIG. 3C is a block diagram illustrating a streamed content sharing system for managing a common media session shared by a plurality of media consumers.

By way of example, reference is made to the block diagram of FIG. 3C showing a streamed content sharing system for managing a common media session shared by a plurality of media consumers. The system includes a media content provider 3140, a playlist repository 3127, and a plurality of client terminals 3120A-D.

The client terminals 3120A-D are in communication with the media content provider 3140 and are operable to stream media content therefrom. The client terminals 3120A-D are further in communication with a common playlist repository 3127 for example via a network connection or the like. The client terminals may be incorporated into, connected to or otherwise associated with various media renderers such as televisions, tablets, smartphones, computers, laptops, music players and the like.

The playlist repository 3127 contains a plurality of playlist session objects 3129A-D which may provide media streaming directions. Media streaming directions, such as a pointer to a media channel; a start time; an end time, a session duration and the like may provide client terminals 3120A-D with instructions directing them to stream specified media content at specified times. The specified media content may be streamed from a media content provider directly, for example via a cable link or the like, alternatively or additionally, a client terminal may stream the media content indirectly for example via a network such as the internet for example.

It is noted that each playlist session object 3129A-D may be managed by a primary media consumer, sometimes termed a VJ or publisher, 3310A-C. The primary media consumer may create and upload a playlist session object, for example pointing to media content selected by the primary consumer. Accordingly, the primary media consumer may be enabled to edit or update the playlist session object in real time, perhaps to reflect their current media consuming behavior.

Accordingly, secondary media consumers may use associated client terminals to follow a primary media consumer or VJ who may use the system to set up a personalized media session. A communication channel may be provided between the primary media consumer and the secondary media consumers following the personalized media session. It is particularly noted that, via such a communication channel, the primary media consumers may obtain feedback from the secondary media consumers and may update the personalized media session in response to such feedback in real time.

For illustrative purposes only and better explain possible applications of the disclosure the following examples are presented. It is noted that the selection of applications is not to be considered exhaustive and that other applications will occur to those in the art.

Figure 4:
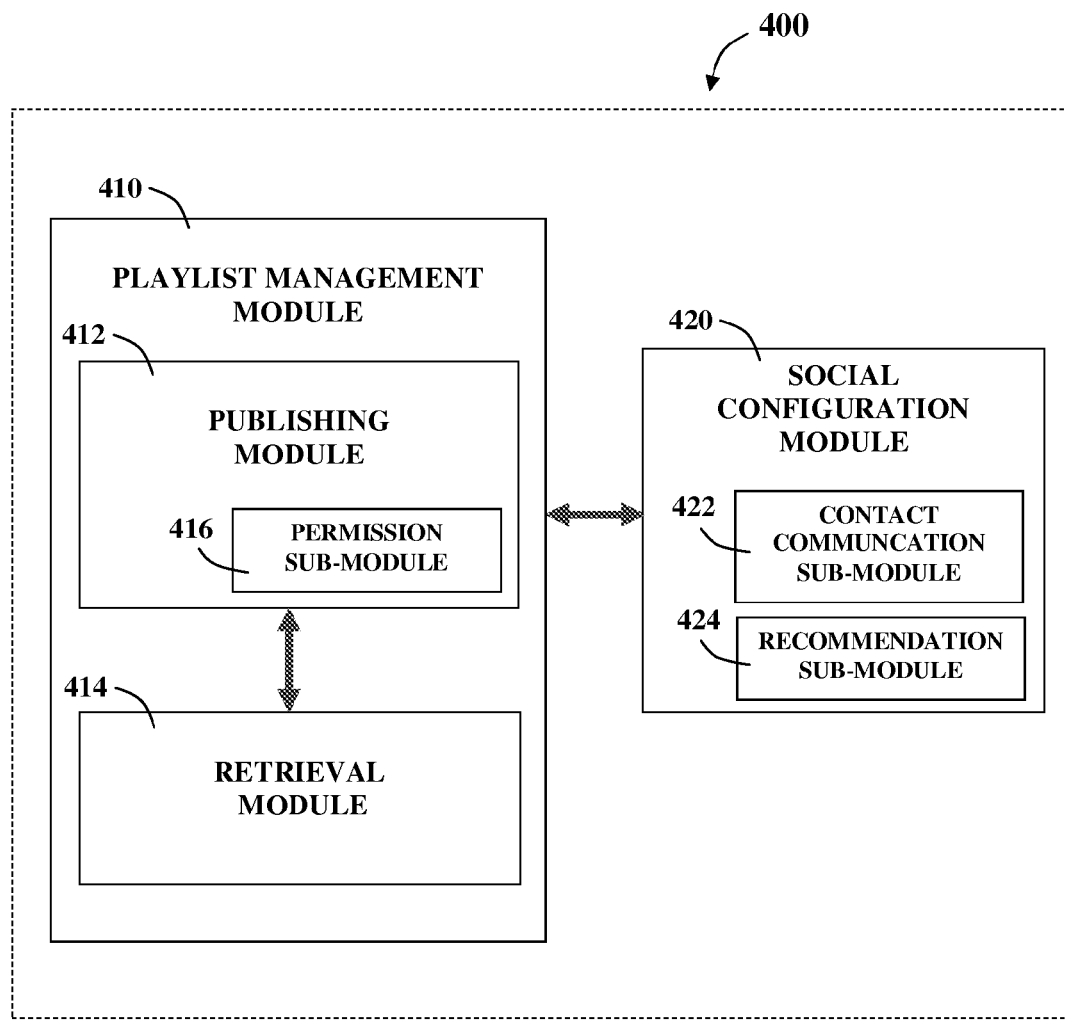
FIG. 4 is a block diagram representing possible modules of a media management system for supporting playlist follow-up functionality.

Reference is made to the system diagram of FIG. 4 showing a representation of a network-based media management software system 400. The media management software system 400 may be used to allow media consumers to share video viewing schedules through playlists, reflecting their television and other digital media environments choices to other members of a social space. The sharing of streamed media content, such as pictures, video, music, text, multimedia files and the like as well as combinations thereof, may be provided in parallel with a contact communication mechanism, such as a chat function, instant messenger, video stream, audio stream or the like, enabling exchange of comments and views.

The media management software system 400 may include a playlist management module 410 in communication with a social configuration module 420. The playlist management module 410 further includes a publishing module 412 and a retrieval module 414, with an internal permission sub-module 416 incorporated into the publishing module 412. The social configuration module 420 further includes contact communication sub-module 422 and recommendation sub-module 424.

Optionally and additionally, playlist follow-up management software may be integrated into other one or more expanded social media platforms.

The playlist management module 410 may provide editing functionality of content items, control follow-up functionality, data reception and communications with the other modules and sub-modules. Additionally or alternatively, follow-up management module functionality may include for example, creating a new playlist, adding/removing content items to/from a playlist, deleting a playlist, storing of a playlist, uploading/removing a playlist to/from follow-up playlist repository, assigning access rights to a playlist via the permission sub-module and the like.

The social configuration module may enable a contact communication mechanism, such as a chat engine or the like, to configure live communication between social members while following a playlist. The social configuration module may further enable social members to connect to a playlist as well as to disconnect from the playlist and the like and may additionally include a layer of managing superimposed multi-layers of different social space members.

The retrieval module may be provided to support management of follow-up requests by members of a social space. Such requests may include, for example, retrieving of tagged or untagged playlists in a social space, retrieving of tagged or untagged playlists of a specific social member or primary media consumer, retrieving descriptive information and schedules of a playlist object and the like.

The permission sub-module may be provided to manage the assignment of access rights to members of the social space, in joining in to follow-up of viewing preferences of a publisher.

Permission attributes may be assigned to playlists defining accessibility or placing limitations. For example, 'ALLOWED' attribute may imply a publicly configured follow-up playlist, allowing any social member to join the follow-up playlist session. 'ALLOW social-group-name' attribute may allow members of a specific social group to join the specific follow-up session, while denying access to other social members, but optionally may provide limited descriptive information. 'NOT-ALLOWED', may imply a private follow-up playlist where access is only allowed to specified members of the social space and access is denied to others, for example.

Alternatively or additionally, access rights may be configured based upon two parameters of the form {S, C}, where 'S' may be referred to as a value representing a social profile of a social member and the 'C' may be referred to as a value representing content, and the combination of the social and content contexts may define the level of allowed access. Such mechanism may enable differentiating and allowing leveled access rights to different social members in the same social space.

Alternatively or additionally, the permission constructs may support a wider range enabling enhanced functionality. Such definitions, for example, associated to additional social group members, may comprise a variety of permission attributes such as 'NONE', 'WRITE', 'READ', 'READ-WRITE' and 'DELETE'. 'NONE' attribute may serve as a default attribute, not allowing any remote editing functionality. 'WRITE' may grant permission for editing new content only. 'READ' may allow viewing only of playlist content and 'READ-WRITE' may allow editing and viewing as described hereinabove. 'DELETE' may allow removing of playlists.

It is further noted that such permission attributes may be content or contact dependent. Accordingly, a particular member of a social space may be provided content dependent permission to update descriptive data of a session playlist of a social member or to access playlist data. For example, a member of the social space may be provided with specific permission attributes allowing the member to read data only if the data is tagged, labeled or otherwise associated with a particular content type.

Figure 5:
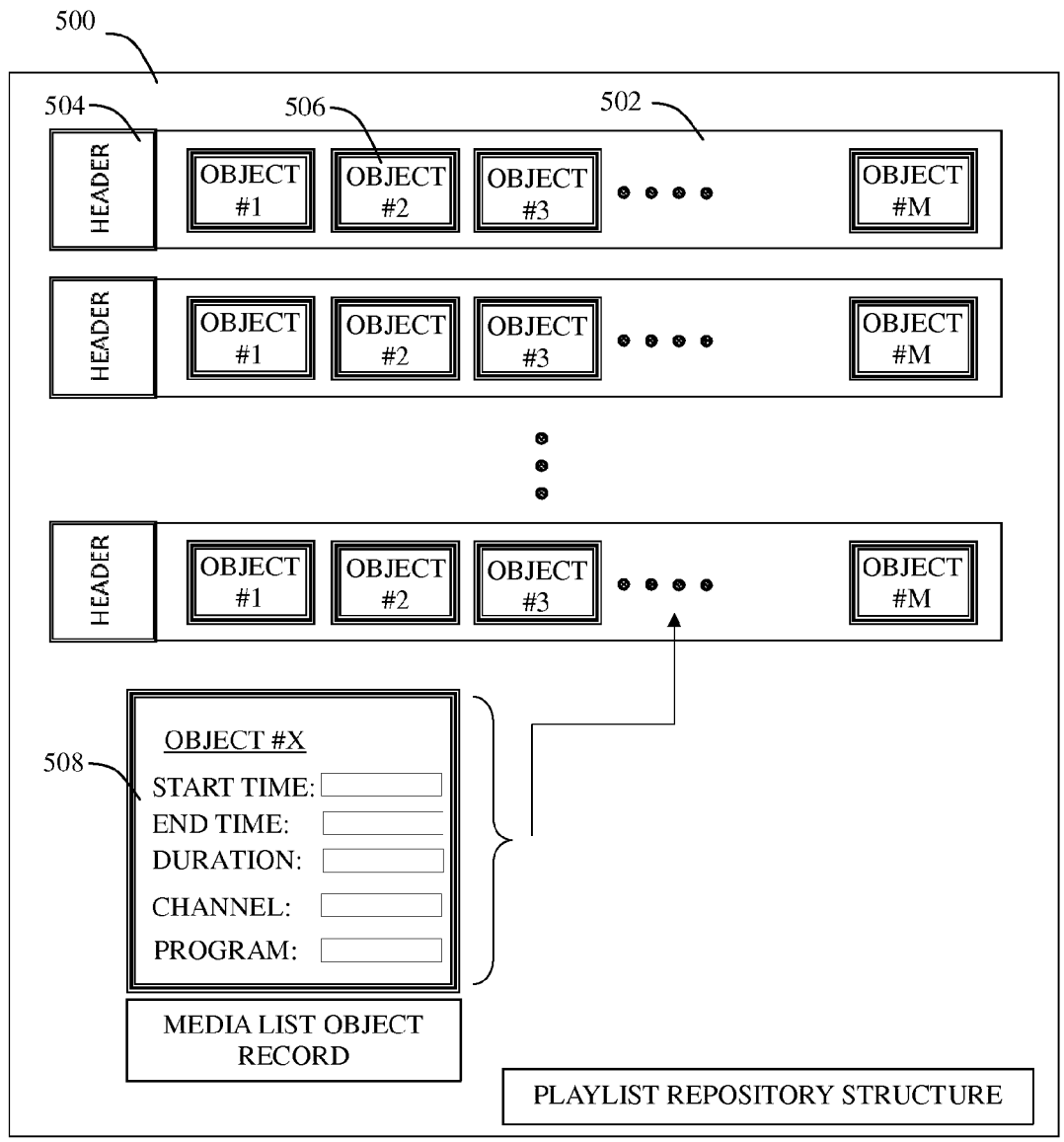
FIG. 5 is a flowchart representing selected actions of a method for a possible object structure of a time slot playlist follow-up repository.

Referring now to the block diagram of FIG. 5, a possible structure is presented for a playlist data repository 500 of the current disclosure. The structure may include at least one media schedule record entry 502 representing a plurality of possible follow-up streamed content items, for example of multiple television programs to be played or the like. The media schedule record entry 502 may have a record header 504, and at least one media schedule object 506. It is noted that each media schedule object 506 may be configured by a set of record fields 508 such as a time slot, a start time, an end time, a duration, as well as the media broadcast channel, pointer or program to be accessed during the timeslot defined thereby. The set of record fields 508 may further include a channel reflecting a media target such as a client server of a primary media consumer, television station, a radio station, a centrally managed DVR, a media provider, internet chat room and the like.

In some structures, media scheduled may be updated live as a publisher changes channels or otherwise selects additional media to be accessed. A following social contact may opt to access such publisher updated media seamlessly in real time, according to preferences profile selected configurations of the user.

Optionally, the timeslot entries of record fields 508 may be extracted from a broadcast target channel program name, and may automatically be updated, if program schedule changes.

Optionally, each media schedule record 502 may further include at least one tagged label specifying the category of a follow-up playlist.

Optionally, each media schedule record entry 502 may include descriptive labels such as who created the list, the media contained in the list and the like.

The playlist data repository 500 may include a plurality of such media schedule records defining playlist follow-ups, from which users may select the media schedule of a publisher they wish to follow.

Thus, it is particularly noted that the current disclosure provides enhanced functionality of real time updates of at least one publisher, reflecting immediate changes in viewing preferences combined with social interaction functionality to respond to these real changes by members in a social space.

Figure 6A:
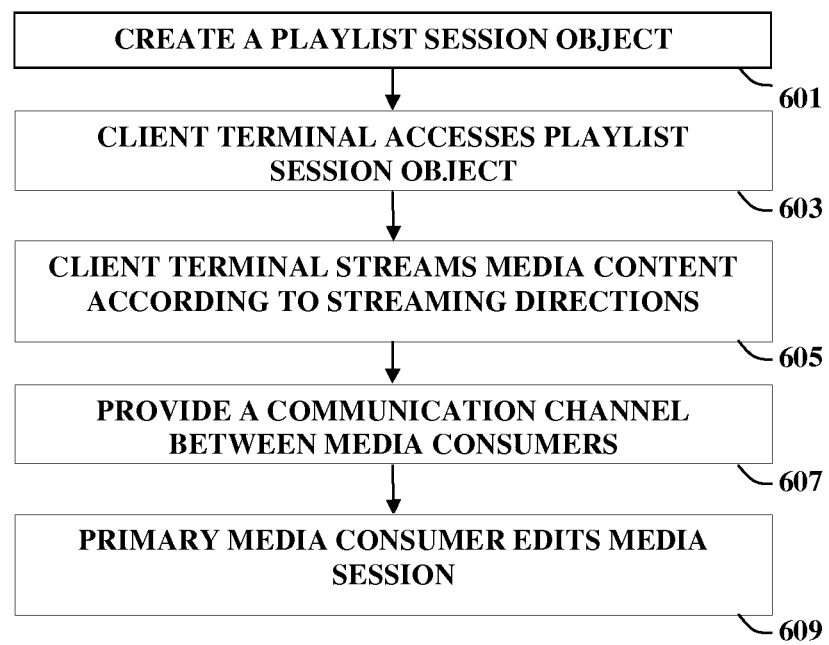
FIG. 6A is a flowchart representing a possible method for sharing streamed content between a plurality of media consumers.

Referring now to the flowchart of FIG. 6A, a method is presented for sharing streamed content between a plurality of media consumers. The method includes creating a playlist session object (601), for example including media streaming directions such as pointers to a media channel or the like. Optionally, the playlist session object may be created by a primary media consumer uploading media streaming directions to a playlist repository. Such media streaming directions may include a pointer allowing secondary media consumers to follow the media behavior of the primary media consumer.

Accordingly, a client terminal may access the playlist session object (603) and may then stream media content according to the streaming instructions of the playlist session object (605).

Optionally, the method may also include providing a parallel communication channel for communication between media consumers (607).

Where required, the primary media consumer may edit the media session (609) perhaps in real time. Such editing may include updating the playlist session object or by updating the object to which the playlist session object points.

Figure 6B:
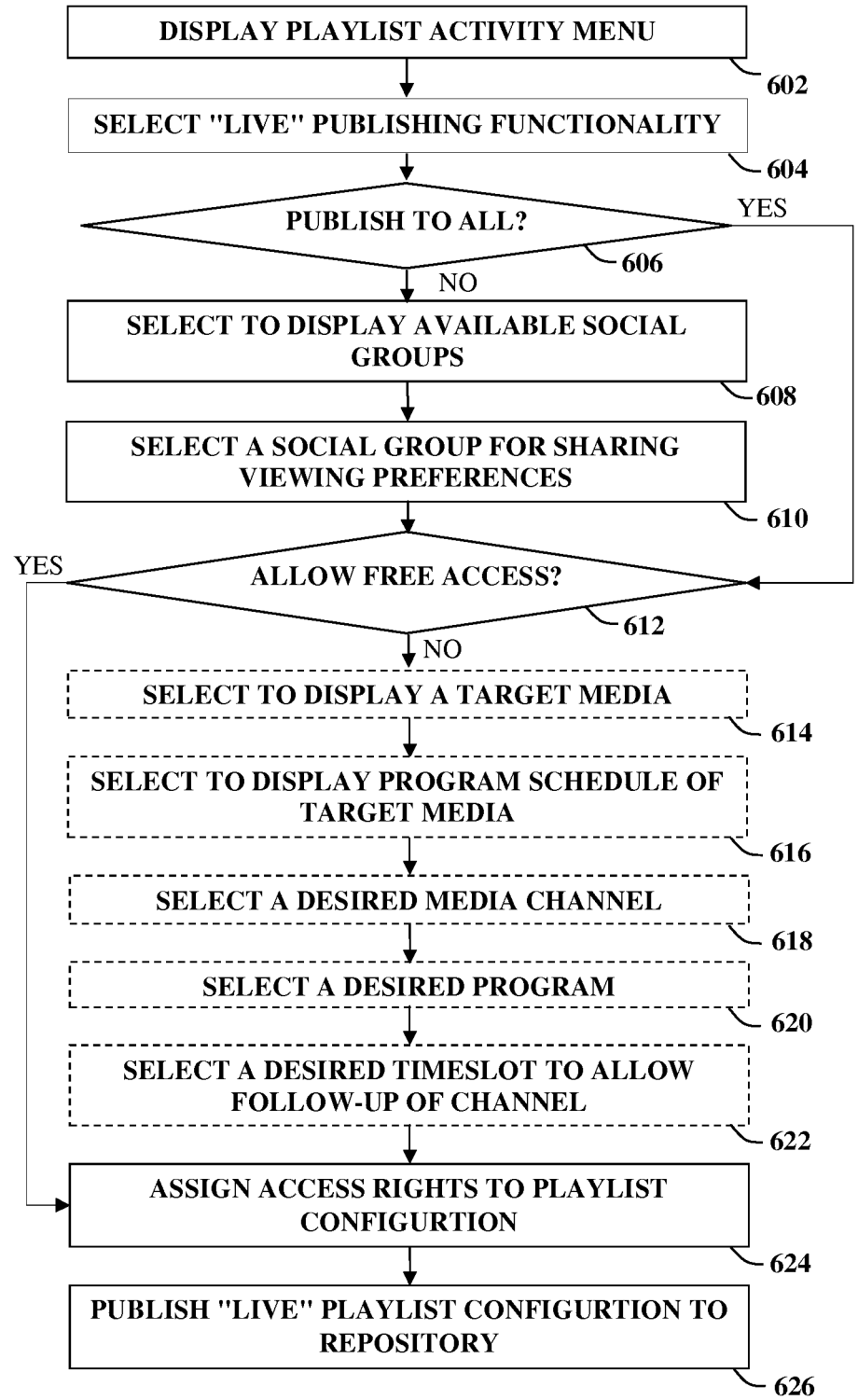
FIG. 6B is a flowchart representing selected actions of a method for creating and publishing live follow-up digital media playlist.

Referring now to the flowchart of FIG. 6B, various selected actions, are illustrated of a possible method for creating and publishing a live playlist for online follow-up by other contacts such as social group members. The method may be used in a playlist follow-up media management system such as described herein and may be related, for example, to a management system such as described in the applicants co-pending applications PCT Patent Application No. PCT/IB2012/054016 and PCT Patent Application No. PCT/IL2013/050186 and U.S. patent application Ser. No. 13/787,905 which are incorporated herein by reference.

It will be appreciated that other similar or different techniques may be used to implement the method.

The method may include displaying an activity menu to a user to provide access to functionality of the playlist follow-up features (602). The activity menu may enable entry to selecting the publishing feature to determine live sharing of viewing preferences of a publisher for further live follow-up (604).

If the publisher selects to allow live sharing of viewing preferences to a limited audience (606), the current list of available social groups may be displayed on screen (608) to allow selecting the specific social group for which live access may be granted to all social members of the group (610). If live access to sharing of viewing preferences is not limited to a particular audience, rather free to all, or a specific social group has already been selected, the user may further continue in determining limitations imposed by content such as a specific channel and a specific program at a specific timeslot or combinations thereof.

Optionally, selecting to display the target media (612), such as a television station, a Data Video Recording (DVR), radio station, media provider, internet chat room and the like (614), to enable further sub-selections of the desired streamed content for sharing.

Optionally, selecting to display the program schedule (616) of the selected target media, to enable further sub-selections of the desired streamed content for live viewing preferences sharing.

Optionally, selecting the desired media channel (618) from the displayed program schedule, as the streamed content item of the shared live playlist viewing session.

Optionally, selecting of the desired program (620) from the selected media channel, as the streamed content item of the shared live playlist viewing session.

Optionally, the user may allow access for joining the shared live playlist viewing session at a specific timeslot (622), determined by start time and an end time, for example, or alternatively by start time and duration live sharing.

Optionally, the timeslot parameters may be extracted from the program schedule and completed automatically, if a program name is specified, as indicated in step (620), as described hereinabove in FIG. 4.

Additionally, access rights may be assigned to the current configuration of the live playlist viewing session (624), for a selected social group, if applicable. Access may be allowed to all social members of a selected social group, when ALLOWED' attributed is assigned or making it a private session by specifying 'NOT-ALLOWED'. Additionally or alternatively, access rights may be configured based upon two parameters of the form {S, C}, where 'S' may be a referred to as a value representing a social profile of a social member and the 'C' may be referred to as a value representing content, and the combination of the social and content contexts may define the level of allowed access. Such mechanism may enable differentiating and allowing leveled access rights to different social members in the same social space.

It is noted default access rights may be assumed, if the step of assigning access rights is skipped. Optionally, default access rights may be defined in the user preferences profile, or may be allocated automatically by the media management system.

It is further noted that access rights may be assigned to specific members of a social space.

Once the associated configuration is completed, publishing may be enabled through pressing a live button or the like, to upload the playlist viewing session onto a on a remote server machine, saving the configuration to the playlist repository.

Optionally, when the configuration is saved on the server side, a notification, such as an email, text message, chat message or the like, may be sent to the social members of the selected social group, triggering contact interaction, if applicable.

It is further noted that where required, tagging an object with metadata information such as category parameters, descriptive details of selected programs and the like may be set automatically by the system, perhaps requiring only a single click instruction from a user.

Figure 7:
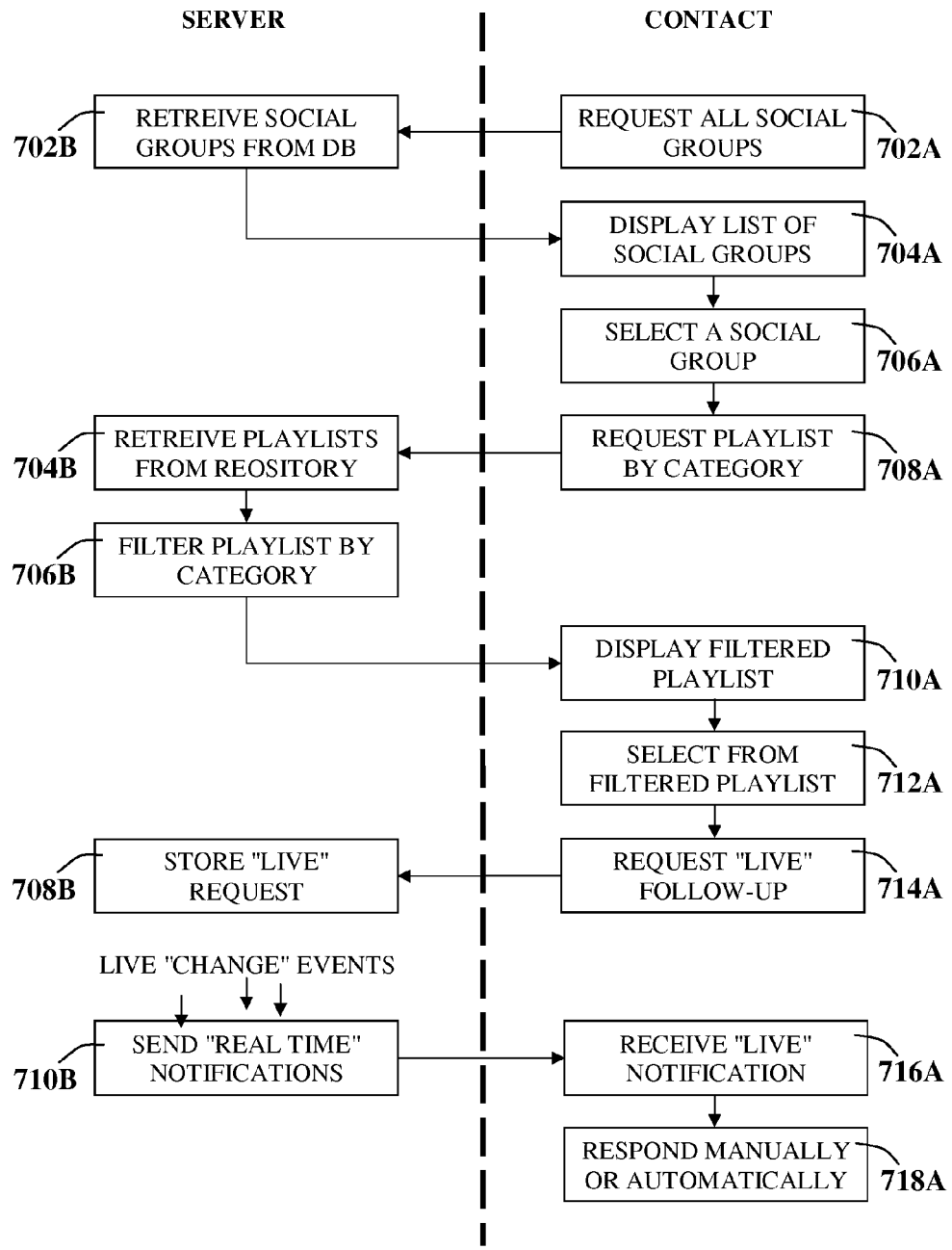
FIG. 7 is a flowchart representing selected actions of a method for user interaction in activating a live follow-up through a published playlist object.

Referring now to the flowchart of FIG. 7, various selected actions, are illustrated of a possible method for interacting with the server while searching a publisher for online follow-up by other contacts such as social group members.

The method may be used in a playlist follow-up media management system such as described herein and may be related, for example, with a management system such as described in the applicants co-pending application such as PCT Patent Application No. PCT/IB2012/054016 and PCT Patent Application No. PCT/IL2013/050186 and U.S. patent application Ser. No. 13/787,905 which are incorporated herein by reference.

It will be appreciated that other similar or different techniques may be used to implement the method.

According to the method, a contact interaction may be initiated with the server through an activity menu allowing requesting the current existing social groups in a specific social space (702A), followed with server response of retrieving the social groups on the server side (702B), sending back to contact the searched results for display on the contact screen (704A). The contact may further select a specific social group from the searched results (706A) and request for a set of playlist objects, characterized by a category (708A). The server may retrieve the playlist of the requested social group (704B) filter the results and select only the playlist objects answering the category criteria to form a new searched result response (706B), sent back to the contact for display (710A).

Optionally, the filtered request may further be refined by requesting to apply a category filter to a specific social member, rather than the whole social group.

From the filtered playlist objects, at least one playlist object, representing one playlist session, may be selected (712A), by the contact to define the desired follow-up session of a specific publisher. The actual triggering of the follow-up session may be implemented by pressing a "Live" button, sending the request to the server (714A), where the playlist session request may be stored (708B). Once the request, specified by a contact for a playlist follow-up session of a specific publisher is stored, any further events related to the requested playlist session may initiate interaction with the contact, sending real time notifications (710B) for any changes the publisher applies to the playlist request stored.

Optionally, a mode of operation, where viewing preferences are changed within the pre-configured playlist session timeslot, may be transmitted in real time to the follower.

The contact, receiving notifications (716A), may respond manually or automatically as may be pre-configured (718A). If contact prefers manual response, it may imply receiving a notification when viewed channel has changed and it is up to the contact to decide to continue the follow-up, bay manually switching to the other channel.

Optionally, the automatic switching by the system, following publisher interactions online, may be configured to be performed in a superimposed window.

The methods and systems described herein may be deployed in part or in whole through a machine or device that executes computer software, program codes, and/or instructions on a processor. The processor may be part of a server, client, network infrastructure, mobile computing platform, stationary computing platform, or other computing platform. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and systems described herein may be deployed in part or in whole through a machine that executes computer software on a server, client, firewall, gateway, hub, router, or other such computer and/or networking hardware.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The scope of the disclosed embodiments may be defined by the appended claims and includes both combinations and sub combinations of the various features described hereinabove as well as variations and modifications thereof, which would occur to persons skilled in the art upon reading the foregoing description.

Technical and scientific terms used herein should have the same meaning as commonly understood by one of ordinary skill in the art to which the disclosure pertains. Nevertheless, it is expected that during the life of a patent maturing from this application many relevant systems and methods will be developed.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A method for use in a system comprising a primary client terminal associated with a primary media consumer and a secondary client terminal associated with a secondary media consumer, the primary client terminal and the secondary client terminal being connected via a communication network,
    wherein said primary client terminal and said secondary client terminal are further in communication with at least one media content provider and are operable to access media content directly from said at least one media content provider,
    said method for operating said secondary client terminal to follow media consumed by said primary media consumer, the method comprising:
    assigning said secondary media consumer to a social group which is allowed free access to follow at least one media playlist consumed by said primary media consumer;
    publishing, by said primary media consumer, a playlist associated with said primary media consumer to members of said social group which is allowed free access;
    accessing, via said communication network, said playlist published by said primary media consumer, said playlist containing a plurality of media content items; and
    automatically switching, by said secondary client terminal, a media renderer associated with said secondary media consumer to render one media content item of said plurality of media content items such that at least a portion of said one media content item is consumed simultaneously by said primary media consumer and by said secondary media consumer, wherein said switching of the media renderer associated with the secondary media consumer is in response to the switching of a media renderer associated with the primary media consumer to render the one media content item.

2. The method of claim 1, further comprising said secondary media consumer electing to follow said primary media consumer.

3. The method of claim 1, wherein the step of accessing comprises:
    requesting a plurality of playlists;
    displaying said plurality of playlists; and
    selecting one of said plurality of playlists.

4. The method of claim 3, wherein said plurality of playlists are associated with a category parameter.

5. The method of claim 4, wherein the category parameter is selected from a group consisting of: a key word, a tagged label, a social group name, a social group category, a social group member name, a descriptive text and combinations thereof.

6. The method of claim 1, wherein said media renderer is selected from a group consisting of a television set, a set-top-box (STB), a desktop computer, a laptop computer, a tablet, a telephone and a mobile communication device.

7. A method for use in a system comprising a primary client terminal associated with a primary media consumer and a secondary client terminal associated with a secondary media consumer, the primary client terminal and the secondary client terminal being connected via a communication network,
    wherein said primary client terminal and said secondary client terminal are further in communication with at least one media content provider and are operable to access media content directly from said at least one media content provider,
    said method for operating said secondary client terminal to follow media consumed by said primary media consumer, the method comprising:
    assigning said secondary media consumer to a social group which is allowed free access to follow at least one media playlist consumed by said primary media consumer;
    publishing, by said primary media consumer, a playlist associated with said primary media consumer to members of said social group which is allowed free access;
    receiving, via said communication network, a real-time notification of a media consumption change, said real-time notification indicating that said primary client terminal associated with said primary media consumer switches from consuming a first media content item to consuming a second media content item; and automatically switching, by said secondary client terminal, a media renderer associated with said secondary media consumer from rendering said first media content item to rendering said second media content item such that at least a portion of said second media content item is consumed simultaneously by said primary media consumer and by said secondary media consumer, wherein said switching of the media renderer is executed in response to said real-time notification.

8. The method of claim 7, wherein said media renderer is selected from a group consisting of a television set, a set-top-box (STB), a desktop computer, a laptop computer, a tablet, a telephone and a mobile communication device.

9. A method for use in a system comprising a central server in communication with a communication network, a primary client terminal associated with a primary media consumer and a secondary client terminal associated with a secondary media consumer; said primary client terminal and said secondary client terminal being connected via said communication network to said central server, wherein said primary client terminal and said secondary client terminal are further in communication with at least one media content provider and are operable to access media content directly from said at least one media content provider, said method for controlling said central server to enable said secondary media consumer to follow media consumed by said primary media consumer, the method comprising:

receiving, by said central server, via said communication network, a request from said secondary media consumer to join a social group which is allowed free access to follow at least one media playlist consumed by said primary media consumer;

assigning said secondary media consumer to said social group which is allowed free access to follow said at least one media playlist consumed by said primary media consumer;

publishing, by said primary media consumer, a playlist associated with said primary media consumer to members of said social group which is allowed free access;

receiving, from said secondary client terminal, a request for a plurality of playlists;

providing said plurality of playlists to said secondary client terminal;

receiving, from said secondary client terminal, a selection of one of said plurality of playlists;

receiving, via said communication network, a real-time notification of a media consumption change, said real-time notification indicating that said primary media consumer switches from consuming a first media content item to consuming a second media content item from said at least one media content provider; and publishing said real-time notification to members of said social group via said communication network such that said secondary client terminal is enabled to access media content directly from said at least one media content provider.

10. The method of claim 9, wherein the step of assigning said secondary media consumer to said social group comprises assigning said secondary media consumer to a social set, said social set being included in said social group.

11. The method of claim 9, wherein the step of assigning said secondary media consumer to said social group comprises storing assignment details pertaining to said secondary media consumer to a storage medium.

12. The method of claim 9, wherein the step of assigning said secondary media consumer to said social group comprises authorizing said secondary media consumer to follow media consumed by said primary media consumer.

13. The method of claim 12 wherein said authorizing comprises assigning at least one permission to said secondary media consumer.

14. The method of claim 13 wherein said permission is selected from a group consisting of: permission to join said social group, permission to manage said social group, permission to monitor access to said social group, permission to join a follow-up session, permission to monitor access to a follow-up session, permission to preview follow-up session schedules and combinations thereof.

15. The method of claim 9, wherein said real-time notification is selected from a group consisting of: an email, a text message, a chat message and combinations thereof.

16. The method of claim 9 wherein the step of publishing said real-time notification to members of said social group comprises tagging said real-time notification with metadata.

17. The method of claim 9 wherein each of said plurality of playlists is associated with a different primary media consumer.

18. The method of claim 9, wherein said plurality of playlists are associated with a category parameter.

* * * * *